March 11, 1941.  J. DE LA CIERVA ET AL  2,234,466
ROTATIVE-WINGED AIRCRAFT
Filed Dec. 30, 1936   3 Sheets-Sheet 1

INVENTOR
Juan de la Cierva and
George Bertrand Leslie Ellis
BY
Lynnstvedt & Lechner
ATTORNEYS Patented Mar. 11, 1941

2,234,466

UNITED STATES PATENT OFFICE 2,234,466

ROTATIVE-WINGED AIRCRAFT

Juan de la Cierva, Aldwych, London, and George Bertrand Leslie Ellis, Thames Ditton, England, assignors, by mesne assignments, to Autogiro Company of America, a corporation of Delaware Application December 30, 1936, Serial No. 118,250

14 Claims. (Cl. 244—18)

This invention relates to rotative-winged aircraft and is especially concerned with a sustaining rotor system having a novel hub and blade articulation arrangement.

In aircraft of this general type it is customary to employ a plurality of blades each one of which is articulated to a common hub by means of a "flapping" pivot and a "drag" pivot, the former comprising a pivot permitting freedom for swinging movement of the blade in a plane substantially containing the rotational axis of the hub, and the latter comprising a pivot permitting freedom for swinging movement of the blade generally fore and aft in its rotative path of travel.

One of the principal objects of the present invention is the provision of hub and articulation members providing a flapping articulation whose axis intersects the rotational axis of the hub. Further objects include accomplishment of the foregoing while retaining all blades of the rotor in a common plane and while employing articulation parts of simple and sturdy construction. It may be noted at this point that while not limited thereto, a number of features of the invention are particularly useful in connection with a rotor having three or an odd number of blades, there being certain problems, effectively overcome by this invention, involved in the mounting of an odd number of blades on flapping axes intersecting the hub axis, which problems are not encountered where an even number of blades are used.

According to the invention, the foregoing is accomplished without resorting to the use of forks or the like embracing the hub, the result being substantial reduction in the overall diameter and size of the hub or head structure as compared with certain prior arrangements.

Still further the invention has in view provision of a rotor head incorporating the features referred to above and additionally incorporating pivot means mounting the hub for tilting movements, for purposes of control in flight. More specifically it is an object of the invention to provide a rotor head structure having the tilting control pivots as well as the flapping pivots for the blades all arranged with their axes intersecting the rotational axis of the hub in a way to avoid bulky or complicated structure at the hub.

Other objects of the invention include simplification of hub manufacture and also manufacture of the associated articulation parts.

How the foregoing, as well as other objects and advantages which will occur to those skilled in the art, are obtained will appear more fully from the following description, making reference to the accompanying drawings in which—

Figure 1:
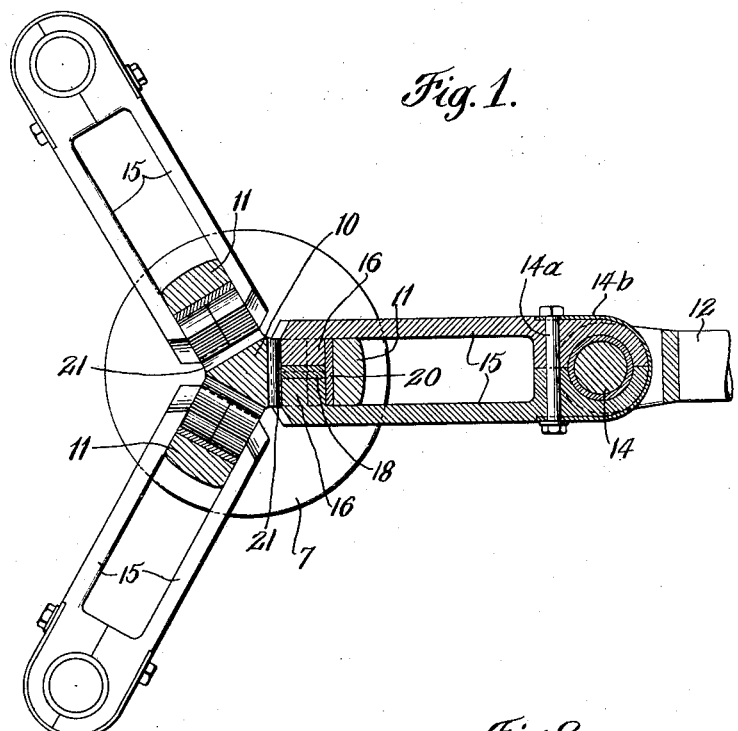
Figure 1 is a plan view, partly in horizontal section, of a rotor head structure including a hub and the articulation parts for attaching a plurality of blades thereto.
Figure 2:
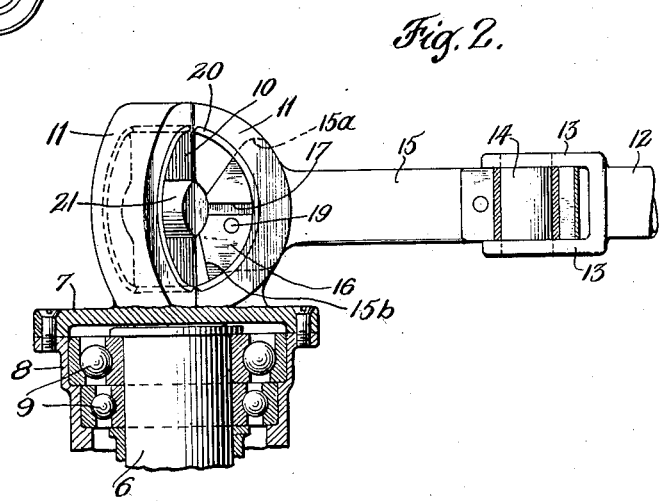
Figure 2 is a side view of the structure of Figure 1, with certain of the parts omitted, the view further including a fragmentary vertical sectional view of rotor hub bearings.

In Figures 1 and 2 a non-rotative hub member or spindle 6 is employed to support the hub member 7 which is positioned above the upper end of the spindle 6. The sleeve 8 to which the hub member 7 is attached is rotatively mounted on the spindle by means of bearings 9.

The hub member proper (7) includes an upwardly projecting central part or post 10 having a plurality of flatted sides equal to the number of blades incorporated in the rotor, three being employed in the arrangement of Figures 1 and 2. The hub further includes a plurality of semi- or parti-circular rings 11 lying in an upright plane and joined at their upper ends to the upper end of the post 10 and at their lower ends to the lower end of the post 10 and the body of the hub. The number of these rings also corresponds to the number of blades used and each ring is positioned opposite to a flatted side of the hub 10 as clearly appears in Figure 1.

The root end portion of a blade spar or spar fitting appears at 12 toward the right-hand side of each of Figures 1 and 2 and is provided with forked parts 13 adapted to embrace the outer end of an extension link, to be secured thereto by means of a pivot 14 constituting a drag articulation. The extension link may effectively be of multi-part construction including a pair of members 15—15 which embrace the pivot 14 and are secured together by means of the bolt 14a and strap 14b. The inner ends of members 15—15 embrace one of the rings 11 and each one is provided at its innermost end with a projection 16 having an outer arcuate surface adapted to ride on the inner surface of the ring 11. In Figure 2 the member 15 at the near side of ring 11 has been omitted in order to illustrate a keyway 17 which is provided in the block or projection 16. When the parts are assembled as shown in Figure 1, a key 18 is positioned partly in each of the keyways 17 of members 16—16. An aperture 19 is also provided to receive a through bolt for the purpose of securing the parts together in assembled position.

When assembled the lateral projections 16—16 of the members 15—15 cooperate to form a bearing shoe riding on the inner surface of the ring 11. If desired an anti-friction liner 20 may be used at the inner surface of the ring 11.

The inside surfaces of the members 15—15 cooperate with the outer sides of the ring 11 to prevent cocking or twisting of the bearing shoe in the guideway. The members 15 may desirably have extended flange surfaces 15a for the purpose of increasing the guiding area.

The foregoing construction permits freedom for flapping movement of the blade and it is here noted that the curvature of the inner side of ring 11 or of its bearing liner 20 is struck from a center point lying on the rotational axis of the hub. Thus, even though the blade mounting for structural convenience is offset from the rotational axis, the "flapping" blade movements occur about a virtual axis intersecting the rotational axis.

In order to ensure properly guided movement of the shoe elements 16—16, the inner side of these elements is curved to cooperate with an arcuate projection 21 formed on the adjacent flatted side of the upright central part 10 of the hub. From inspection of Figure 2 it will also be seen that excessive downward movement of the blade (as when not rotating) will be arrested by contact of the lower inner face 15b of the shoe elements 16 with the lower part of the adjacent flatted side of the post 10. Similarly, excessive upward movement of the blade will be arrested by contact of the upper side of the shoe with the member 10 adjacent the top of the hub.

The arrangement illustrated in Figures 1 and 2 provides an extremely compact hub which, at the same time, is of sturdy and simple construction, and provides the advantages incident to a flapping pivot having an axis intersecting the rotational axis.

Figure 3:
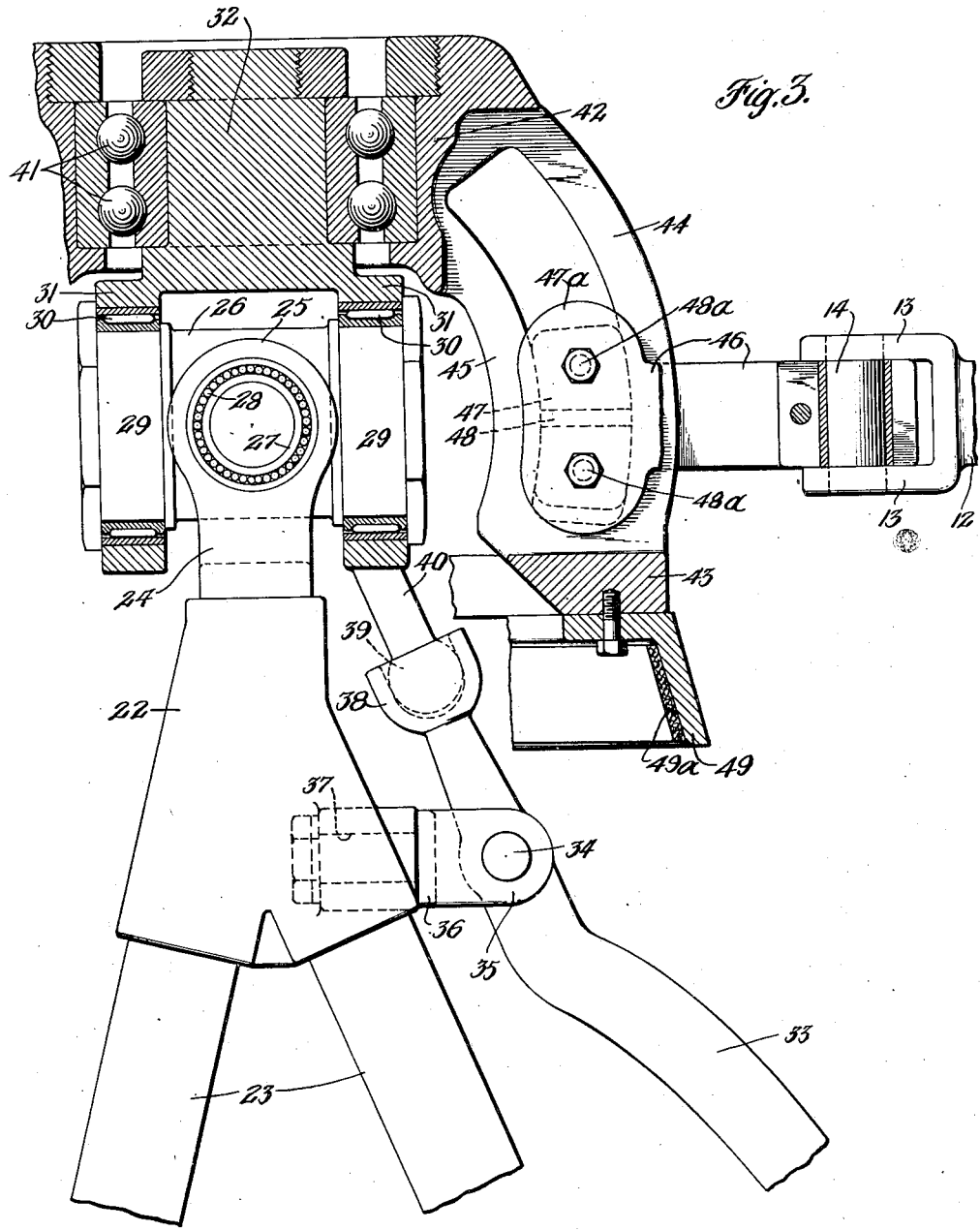
Figure 3 is a side view, partly in vertical section, of a modified rotor head structure, in which control pivots are also provided.

In Figure 3 we have illustrated a modified structure of the general type shown in Figures 1 and 2 but which further incorporates control pivots for tilting the rotor hub.

In this arrangement a support 22 mounted at the top of any suitable number of pylon legs 23 serves to carry a forked device 24, the two upwardly projecting forked parts 25 of which embrace a block 26 and are coupled with the block by means of a pivot 27 which is desirably journaled in needle bearings 28. The block 26 is thus free to rock about the axis of pin 27 which, as viewed in Figure 3, is normal to the plane of the drawings.

Block 26 in turn has cylindrical end parts 29 which are journaled by means of needle bearings 30 in a pair of spaced and apertured lugs 31, depending from the non-rotative hub spindle 32. The parts 29, 30 and 31 thus provide an axis of movement of the non-rotative hub spindle 32, which axis intersects with the first tilting control axis and lies in the plane of the drawings.

Tilting movements may be controlled by means of a depending control stick such as shown at 33, this stick being pivoted as at 34 to a pair of apertured ears 35 formed on member 36. This latter member is in turn mounted on the support member 22 by means of an additional pivot 37. The control stick 33 may thus be moved either fore and aft or transversely and its upper end is cupped at 38 to receive a ball 39 formed at the lower end of the control arm 40, this control arm being rigid with one of the apertured lugs 31 and thus movable with the non-rotative hub spindle 32. The ball and socket joint 38—39 and the pivots 34 and 37 provide for tilting of the hub spindle 32 in any direction.

The spindle 32 is surrounded by the main hub bearings 41 which in turn serve to carry the hub proper, consisting of an upper ring 42 directly cooperating with the bearings. The hub further includes a lower ring 43 and the space between these two rings is spanned by pairs of guide elements 44—45 which cooperate in defining an arcuate trackway or channel which is curved about a center point coinciding with the point of intersection of the control pivot axes and the rotational axis. Otherwise stated, the two control pivot axes and also the center of the arcuate guideway just mentioned thus all coincide or intersect at a single point with the rotational axis of the hub.

As in the arrangement of Figures 1 and 2, a root end fitting of a blade spar is shown at 12 toward the right of Figure 3, this fitting being provided with forked parts 13—13 which embrace the outer end of an extension link and which are coupled to the extension link by means of a pivot 14. The extension link in the arrangement of Figure 3 may be similar to that described above, i. e., of multi-part construction including a pair of members 46 embracing the arcuate guide member 44 and carrying at their inner ends projections 47 which may be keyed together as at 48 in a manner similar to that described above, to form a bearing shoe adapted to ride in the arcuate guideway provided between the guide parts 44 and 45. Integral flange members 47a may also be employed, one on each of the link members 46 at the sides of the guide parts 44 and 45, the flanges being of sufficient width to overlap the guide parts and adapted to bear against side faces of the guide parts in order to resist any tendency for torsional movement of the blade about its own axis and thus twisting of the bearing shoe in the guideway. The link parts 46—46 may be secured together by means of a pair of bolts 48a—48a.

As in the arrangement of Figures 1 and 2, downward drooping of the blade is limited by contact of the bearing shoe with the bottom of the arcuate guideway, and upward flapping of the blade is limited by contact of the bearing shoe with the upper end of the guideway.

The continuous ring 43 at the lower edge of the rotative hub serves to strengthen the hub structure and may also serve to carry a ring 49 having a friction lining 49a which may be brought into contact (by tilting the hub) with a friction driving pinion, as shown in and described with reference to Figure 21 of the copending application of Juan de la Cierva, Serial No. 645,985 filed December 6, 1932. These parts may be employed for the purpose of driving the rotor, for example, when initiating rotation thereof prior to take-off.

The arrangement of Figure 3 is of especial advantage in providing a combination of desirable characteristics in a rotor system, including control pivots having axes intersecting the hub axis and lying in substantially the horizontal plane of the blades, and flapping pivot axes for the individual blades not only intersecting the rotational axis but also so located as to intersect the rotational axis at the same point as the point of intersection of the control pivot axes.

Ease of control, especially in certain normal flight maneuvers, is improved by virtue of this arrangement. It may here further be noted that the foregoing may also be accomplished in a rotor system with any desired number of blades, including one incorporating three blades. By virtue of the arrangement of parts a three-bladed rotor may be provided with flapping pivot axes intersecting the rotational axis just as readily as a rotor having any other number of blades, without having the structure of articulation extending actually to the center or interfering with the tilting fulcrums.

Figure 4:
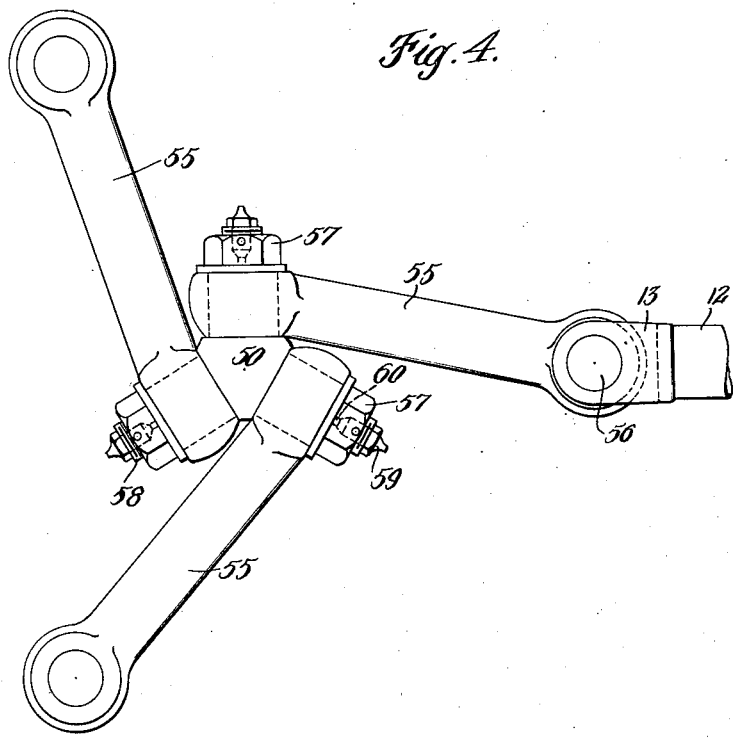
Figure 4 is a top plan view of a further modification.
Figure 5:
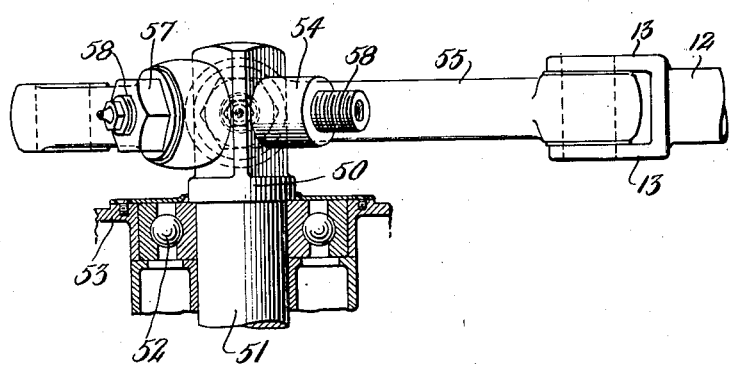
Figure 5 is a side view similar to Figure 2 further illustrating the arrangement of Figure 4.

In accordance with the arrangement shown in Figures 4 and 5 an extremely simple hub device may be employed. Here the rotative hub part 50 has a downwardly extending part in the form of a spindle or shaft 51 which is conveniently journaled as by a bearing 52 in a non-rotative surrounding structure 53. As best seen in Figure 4, the hub part proper has a plurality of flatted sides the number of which is (as in the case of Figures 1 and 2) the same as the number of blades incorporated in the rotor. From each one of these flatted sides a pivot pin 54 projects, the pins having axes which intersect the rotational axis of the hub.

Attachment of the blades to this hub may include the use of a fitting 12 with forked parts 13—13 which again cooperate with an extension link, in this form identified by the numeral 55. The extension link and forked parts are joined by a pivot 56 which constitutes a drag articulation.

The inner end of each link 55 is provided with an eye in which a pivot pin 54 is received, the link being secured in position by means of a nut 57 threaded on to pin extension 58.

A lubricant fitting 59 may desirably be tapped into the end of the extension 58 to feed lubricant through a duct 60 to the bearing surfaces about the pin 54.

The foregoing arrangement it will be noted is of extremely simple construction and, in common with the arrangements of Figures 1 to 3, provides for the use of flapping pivots for the individual blades, even in a three-bladed rotor, which flapping pivots have axes intersecting the rotational axis of the rotor hub. Although the connection of the extension links 55 with the hub is slightly offcenter or offset to a side of the hub, it will be observed that the amount of offset is very slight and further that each extension link is configured in such manner as to bring the axis of the drag articulation 56 into a vertical plane containing the hub axis and perpendicular to the flapping pivot axis. Bending moments and stresses are thereby kept at a minimum.

In conclusion it may be noted that all of the arrangements herein disclosed provide a flapping pivot, with its axis intersecting the hub axis, which pivot has only a single bearing surface subject to the centrifugal load of the associated blade. Problems of alignment of several such bearing surfaces, as employed in certain prior arrangements, therefore do not arise. In the arrangement of Figures 4 and 5 this single bearing surface is formed by the single pivot pin provided for each blade, the simplicity of the structure being an outstanding advantage. On the other hand, in the arrangements of Figures 1 to 3 inclusive this single bearing surface which is subject to the centrifugal load of the associated blade is centered with respect to a vertical plane containing the rotor axis and longitudinal blade axis.

The arrangements of Figures 1 and 2 and Figures 4 and 5 also make possible the employment of an unusually simple and readily manufactured form of hub.

We claim:

1. For a multi-bladed aircraft sustaining rotor, a hub having, for each blade, a parti-circular ring projecting therefrom and lying generally in a plane containing the hub axis and the longitudinal blade axis, and a bearing shoe riding on the inner side of said ring to provide freedom for swinging movement of the blade with respect to the hub.

2. For a multi-bladed aircraft sustaining rotor, a hub having, for each blade, a parti-circular ring projecting therefrom and lying generally in a plane containing the hub axis and the longitudinal blade axis, and a bearing shoe riding on the inner side of said ring to provide freedom for swinging movement of the blade with respect to the hub, the said ring being provided with a concave bearing surface on which the shoe rides, which surface is curved about an axis substantially intersecting the axis of the hub.

3. For an aircraft sustaining rotor, a blade, a rotative hub having a parti-circular ring projecting therefrom, a pair of members secured to the blade and projecting inwardly in spaced relation to embrace said ring, and bearing means connected with said pair of members adjacent their inner ends and riding on the inner surface of said ring, whereby to provide freedom for blade movement with respect to the hub.

4. For an aircraft sustaining rotor, a blade, a rotative hub having a parti-circular ring projecting therefrom, a pair of members pivotally secured to the blade to provide a drag articulation and projecting inwardly from the blade in spaced relation to embrace said ring, and bearing means connected with said pair of members adjacent their inner ends and riding on the inner surface of said ring to provide a flapping articulation.

5. For a multi-bladed aircraft sustaining rotor, a rotative hub member including vertically spaced rings, for each blade an arcuate trackway lying in a generally vertical plane and interconnecting said rings, and means secured to the blade and riding on said trackway to provide a flapping articulation for the blade.

6. For a multi-bladed aircraft sustaining rotor, a rotative hub member including vertically spaced rings, for each blade an arcuate trackway lying in a generally vertical plane and interconnecting said rings, means secured to the blade and riding on said trackway to provide a flapping articulation for the blade and a rotor driving element associated with the lower ring.

7. For a multi-bladed aircraft sustaining rotor, a rotative hub member including vertically spaced rings, for each blade an arcuate trackway lying in a generally vertical plane and interconnecting said rings, means secured to the blade and riding on said trackway to provide a flapping articulation for the blade, and mounting means for said rotative hub including a pivot having an axis lying substantially in a horizontal plane between the planes of said rings.

8. For a multi-bladed aircraft sustaining rotor, a rotative hub including a generally upright post, and a plurality of semi-circular rings joining the upper and lower ends of said post, the number of rings being equal to the number of blades included in the rotor, bearing means for each blade adapted to ride on the inner surface of one of the rings to provide a flapping articulation, and a convex bearing surface formed on said post and cooperating with the bearing means in providing guided flapping movement of the blade.

9. For a multi-bladed aircraft sustaining rotor, a rotative hub including a generally upright post, and a plurality of semi-circular rings joining the upper and lower ends of said post, the number of rings being equal to the number of blades included in the rotor, and bearing means for each blade adapted to ride on the inner surface of one of the rings to provide a flapping articulation.

10. In a multi-bladed aircraft sustaining rotor, a rotative hub, and a flapping pivot for each blade connecting the same with the hub including a pivot bearing formed on the hub and having only a single pivot bearing surface subject to the centrifugal load of the associated blade, which pivot bearing surface is of parti-circular shape curved and extending generally upwardly and downwardly with respect to the path of rotation of the blade, the axis of the pivot bearing surface intersecting the rotational axis of the hub, and said pivot bearing surface being centered with respect to a vertical plane containing the rotor axis and the longitudinal blade axis, and means for restraining movement of the blade on said pivot bearing in the pitch change sense.

11. In an aircraft sustaining rotor, a blade, a hub, and articulation means for connecting the blade with the hub including a pair of parti-circular spaced concentric bearing surfaces nested one within the other substantially in a radial plane containing the hub axis to form an annular trackway, a cooperating bearing shoe adapted to ride in said trackway between said surfaces during articular movement of the blade with respect to the hub, and means for restraining relative movement of said bearing shoe and bearing surfaces about the longitudinal axis of the blade.

12. For a multi-bladed aircraft sustaining rotor, a tiltably mounted non-rotative hub support, a rotative hub journalled on said support including vertically spaced rings, for each blade an arcuate trackway lying in a generally vertical plane and interconnecting said rings, means secured to the blade and riding on said trackway to provide a flapping articulation for the blade, an annular rotor driving element associated with the lower ring, and controllable means for tilting the hub support including a control connection coupled with said hub support and extended downwardly through said annular driving element.

13. For a multi-bladed aircraft sustaining rotor, a non-rotative hub support, a rotative hub journalled on said support for rotation about a generally upright axis, means mounting the hub support for tilting movement about a point on said axis, the rotative hub member including vertically spaced rings, for each blade on arcuate trackway lying in a generally vertical plane and interconnecting said rings, said trackway being curved about an axis intersecting the point of tilting of the hub support, means secured to the blade and riding on said trackway to provide a flapping articulation for the blade, an annular rotor driving element associated with the lower ring, and controllable means for tilting the hub support including a control connection coupled with said hub support and extended downwardly through said annular driving element.

14. For a multi-bladed aircraft sustaining rotor, a non-rotative hub support, a rotative hub journalled on said support for rotation about a generally upright axis, means mounting the hub support for tilting movement about a point on said axis, the rotative hub member including vertically spaced rings, for each blade an arcuate trackway lying in a generally vertical plane and interconnecting said rings, said trackway being curved about an axis intersecting the point of tilting of the hub support, and means secured to the blade and riding on said trackway to provide a flapping articulation for the blade.

JUAN DE LA CIERVA.
GEORGE BERTRAND LESLIE ELLIS.